(12) United States Patent
Attianese et al.

(10) Patent No.: US 8,922,180 B2
(45) Date of Patent: Dec. 30, 2014

(54) METHOD FOR ENHANCING CONVERSION EFFICIENCY AT LOW LOAD OF A STEP-DOWN DC-DC SWITCHING CONVERTER AND RELATED CIRCUIT

(71) Applicant: DORA S.p.A., Aosta (IT)

(72) Inventors: Domenico Attianese, Aosta (IT); Giorgio Oddone, Villeneuve (IT)

(73) Assignee: DORA S.p.A., Aosta (IT)

( * ) Notice: Subject to any disclaimer, the term of this patent is extended or adjusted under 35 U.S.C. 154(b) by 108 days.

(21) Appl. No.: 13/800,511

(22) Filed: Mar. 13, 2013

(65) Prior Publication Data

US 2013/0271098 A1 Oct. 17, 2013

(30) Foreign Application Priority Data

Apr. 17, 2012 (IT) .............................. MI2012A0626

(51) Int. Cl.
| | |
|---|---|
| *G05F 1/00* | (2006.01) |
| *G05F 1/46* | (2006.01) |
| *H02M 3/158* | (2006.01) |
| *H02M 1/00* | (2006.01) |

(52) U.S. Cl.
CPC ................. *G05F 1/46* (2013.01); *H02M 3/158* (2013.01); *H02M 2001/0006* (2013.01); *H02M 2001/0032* (2013.01); *Y02B 70/16* (2013.01)

USPC .......................................................... 323/282

(58) Field of Classification Search
USPC .................................................. 323/271, 282
See application file for complete search history.

(56) References Cited

U.S. PATENT DOCUMENTS

| | | | | |
|---|---|---|---|---|
| 5,528,132 | A | * | 6/1996 | Doluca .......................... 323/284 |
| 5,596,465 | A | * | 1/1997 | Honda et al. ................... 323/284 |
| 6,163,140 | A | * | 12/2000 | Garnett et al. ................. 323/234 |
| 7,309,976 | B2 | * | 12/2007 | Hachiya ......................... 323/282 |
| 7,723,971 | B2 | * | 5/2010 | Hachiya ......................... 323/282 |
| 2006/0001409 | A1 | | 1/2006 | Hachiya |
| 2010/0270991 | A1 | | 10/2010 | Suzuki |
| 2011/0291637 | A1 | | 12/2011 | Vijayaraghavan et al. |

* cited by examiner

*Primary Examiner* — Jue Zhang
(74) *Attorney, Agent, or Firm* — Seed IP Law Group PLLC

(57) ABSTRACT

Powering the internal circuitry, that is the controller of the power switch of a step-down DC-DC converter for a broad range of values of output voltage and achieving an enhanced energy saving in a low load conditions of operation is made possible by a method and implementing circuit based on defining two distinct thresholds of discrimination of the output voltage, both tied to a reference voltage, for generating two respective control signals and defining, from logical combinations of said two control signals, three distinct regions of operation of the converter upon the varying of electrical parameters, respectively identified by logical combinations of a pair of enabling signals.

17 Claims, 4 Drawing Sheets

METHOD FOR ENHANCING CONVERSION EFFICIENCY AT LOW LOAD OF A STEP-DOWN DC-DC SWITCHING CONVERTER AND RELATED CIRCUIT

BACKGROUND

1. Technical Field

This disclosure relates in general to step-down DC-DC switching converters and in particular to self powering techniques of the control circuits of the converter through an internal linear voltage regulator that is connected to the output voltage node of the converter, disconnecting it from the input voltage node thereof, in order to reduce power absorption.

2. Description of the Related Art

By using the output voltage of the converter itself for supplying the controller of a power switch adapted to intermittently transfer electrical power from the input node to the output node and an external electrical load, power consumption within the controller may be reduced by a factor equal to the ratio between the output voltage and the input voltage.

Possible solutions have been sought and circuital embodiments proposed for exploiting this opportunity when work conditions of the converter may consent it, but they have shortcomings of non-fully optimal management of the energy saving and/or of being applicable only to restricted types of applications.

The document U.S. Pat. No. 5,528,132-A describes a method and related circuit wherein an internal voltage regulator of the DC-DC converter is coupled to the output voltage node when the output voltage becomes greater than the nominal (design) voltage of the linear regulator. The proposed circuit architecture is depicted in FIG. 1. Clearly, the output voltage values must be compatible with the admissible maximum supply voltage of the internal circuitry on the chip. Wherever a broader variability of the output voltage (beyond said compatibility limit) is desired, this solution is inapplicable because of the risk of destroying the chip if the output voltage should overcome said safe operation voltage of the control circuit components.

The published patent application US2006001409-A1, describes a circuit the architecture of which is depicted in FIG. 2. The linear voltage regulator internal to the DC-DC converter has two distinct output stages, one connected to the input voltage node of the converter and the other to the output voltage node, which are selectively driven by the linear regulator depending on whether the output voltage is lower or greater than a reference voltage. Though compatible with any level of output voltage of the converter, the absorption of the linear regulator persists in every functioning condition.

BRIEF SUMMARY

One embodiment of the present disclosure overcomes the above-mentioned limitations and persisting inefficiencies of known solutions, allowing to power the controller of the power switch of the step-down converter for a broad range of values of the output voltage and achieves a greater energy-saving under low load conditions.

One embodiment of the present disclosure is a method that includes defining two discrimination thresholds (VREF2/KDIV1, VREF2/KDIV2) of the output voltage (VOUT), which are compared to a reference voltage (VREF2), for generating two respective control signals (VCTRL1, VCTRL2), and identifying through logic combinations of the two control signals three distinctive operation regions of the converter upon the variation of electrical parameters, respectively identified by the logic combinations of the logic values of a pair of enable signals (EN1, EN2).

The pair of enabling logic values is thus exploited for:

enabling a first linear regulator LDO1 that regulates the supply voltage VCC of the controller by selectively connecting the input voltage VIN with an internal supply node VCC, disabling, and placing in a high impedance state an output stage DMOS2 of a second linear regulator LDO2 that regulates the supply voltage VCC by selectively connecting the output voltage VOUT with an output node of the second regulator LDO2, and disabling a connection device CONN_DEV that, when enabled, connects the output node of the second linear regulator LDO2 with the VCC node, as long as the output voltage is below a first one VREF2/KDIV1 of said two thresholds;

disabling, and placing in a high impedance state an output stage DMOS1 of the first linear regulator LDO1, enabling the second linear regulator LDO2, and enabling the connection device CONN_DEV to connect the output node of the second linear regulator LDO2 with the VCC node, when the output voltage is greater than the second one VREF2/KDIV2 of said two thresholds; and disabling both linear regulators LDO1, LDO2 while forcing into a conduction state the output stage DMOS2 of said second linear regulator LDO2, which directly couples the output VOUT of the controller with the output node of the second regulator LDO2, and enabling the connection device CONN_DEV, connecting the controller output VOUT to the internal supply node VCC, when the output voltage is equal to or greater than the first threshold VREF2/KDIV1 and lower than or equal to the second one VREF2/KDIV2 of said two thresholds.

DETAILED DESCRIPTION

Figure 1:
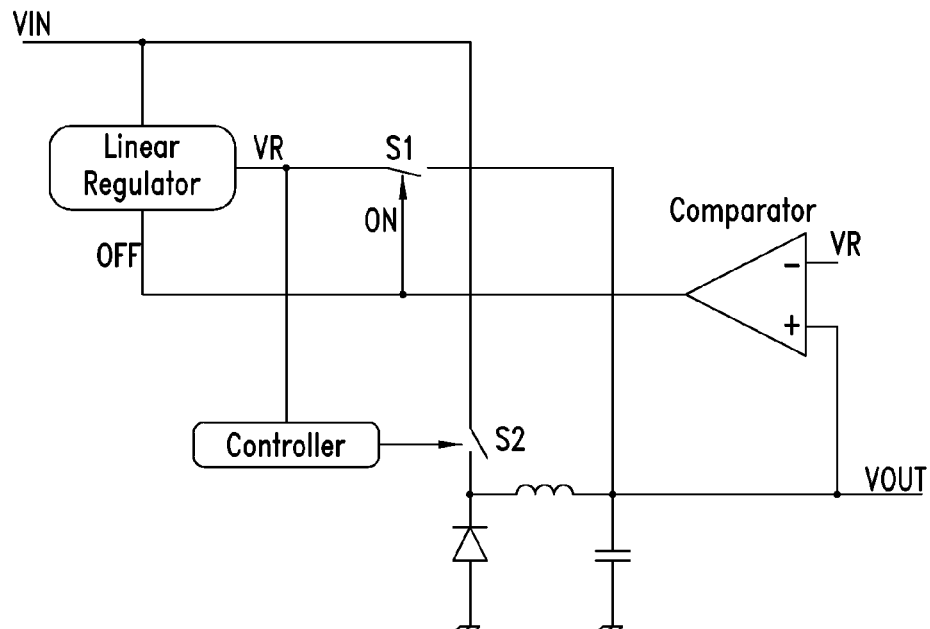
FIG. 1 shows a known circuit diagram as previously commented.
Figure 2:
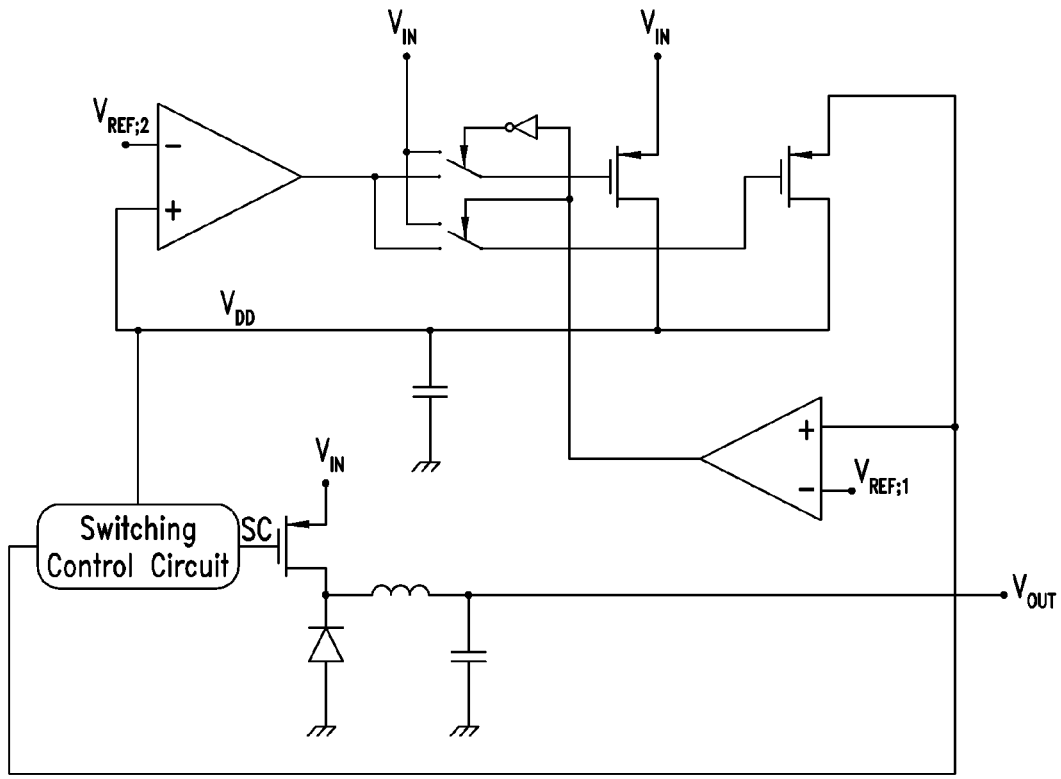
FIG. 2 shows another known circuit diagram as previously commented.
Figure 3:
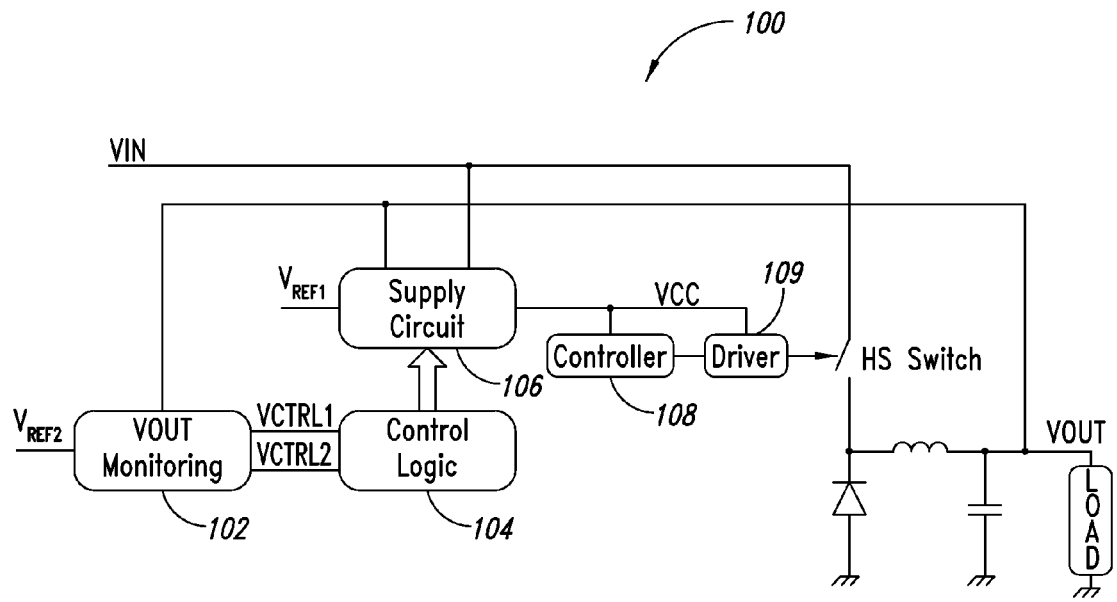
FIG. 3 shows the general circuit architecture of the novel converter of this disclosure.

An exemplary embodiment of a step-down DC-DC switching converter 100 is depicted in the basic diagram of FIG. 3.

The switching converter 100 includes a functional circuit block, VOUT Monitoring 102, for assessing the level of the output voltage VOUT of the step-down DC-DC converter 100, relative to two distinct discrimination threshold values VREF2/KDIV1 and VREF2/KDIV2. Based on the level of the output voltage VOUT provided to a load LOAD, a control logic block 104 generates a set of signals adapted to selectively configure a supply circuit 106 in any of three different ways. The supply circuit 106 provides a regulated voltage supply VCC to power a common dedicated integrated circuit controller 108 and a driver 109. The controller 108 includes a number of analog and digital circuits that are powered by the regulated voltage supply Vcc and generally implements a feedback control of the driver 109, which drives the power switch HS Switch of the DC-DC converter 100, in order to achieve efficient performance from the point of view of energy savings (i.e., reduction of power absorption from the source VIN, relative to known devices).

Figure 4:
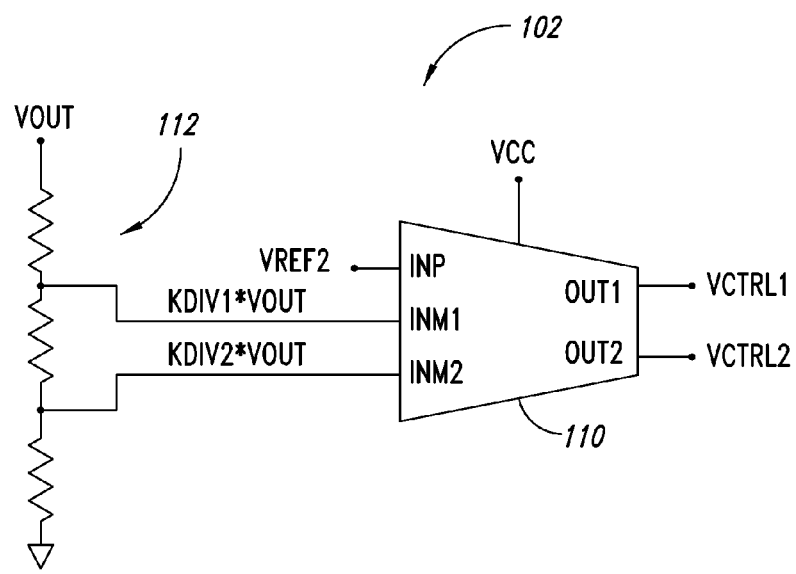
FIG. 4 shows the functional block diagram of the circuit that analyzes the output voltage, on which the novel architecture is founded.

A diagram of the VOUT-monitoring block 102, is depicted in FIG. 4, according to an embodiment. In this embodiment, a two-threshold, two output comparator 110 and a voltage divider 112 are used in order to generate a pair of control signals VCTRL1 and VCTRL2. The voltage divider 112 divides the output voltage VOUT of the converter according to divider ratios KDIV1 and KDIV2 to produce respective voltage values KDIV1·VOUT and KDIV2·VOUT for comparison with the reference voltage VREF2. Effectively, these comparisons are equivalent to comparing the output voltage VOUT with threshold values VREF2/KDIV1 and VREF2/KDIV2. The control logic block 104 produces first and second enabling logic signals EN1, EN2 according to the states of the control signals VCTRL1 and VCTRL2.

Figure 5:
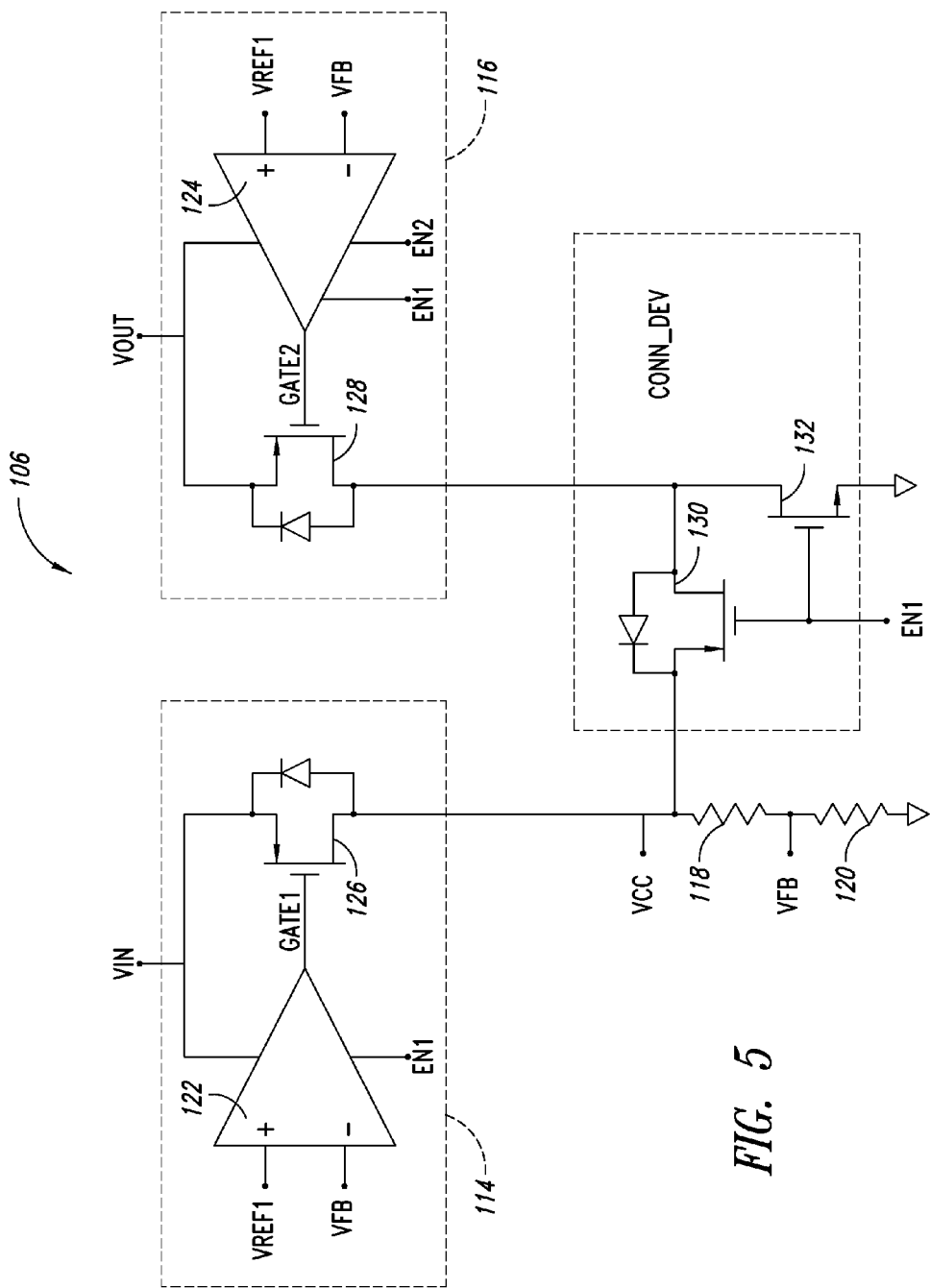
FIG. 5 is a sample embodiment of the power supply circuit of the internal control circuitry of the converter.

A diagram of the supply circuit 106 is depicted in FIG. 5, according to an embodiment. In this embodiment, the supply circuit 106 includes two distinct linear drop out (LDO) voltage regulators 114, 116, first and second resistors 118, 120, and a connecting device CONN_DEV. The output of the first LDO regulator 114 is coupled to an input of the connecting device CONN_DEV at a node configured to supply a regulated output voltage Vcc. The first and second resistors 118, 120 are connected to each other at an intermediate node configured to supply a feedback voltage VFB that is proportional to the regulated output voltage Vcc. The connecting device CONN_DEV is connected in the electric current path between the second DMOS transistor 128 of the second LDO regulator 116 towards the output node configured to provide the regulated supply voltage VCC to the controller 108.

The LDO regulators 114, 116 include respective differential amplifiers (error amplifiers) 122, 124 and respective output stages implemented respectively by double-diffused metal-oxide-semiconductor (DMOS) transistors 126, 128. The differential amplifiers 122, 124 have respective inverting and non-inverting inputs coupled to receive the reference voltage VREF1 and the feedback voltage VFB, respective supply terminals, and respective output terminals coupled respectively to the gates of the DMOS transistors 126, 128. The supply terminal of the first differential amplifier 122 is connected to the input voltage VIN and the supply terminal of the second differential amplifier 124 is connected to the output voltage VOUT. In addition, the first differential amplifier 122 has an enable terminal configured to receive a first enable signal EN1 from the control logic 104 and the second differential amplifier 124 has first and second enable terminals respectively configured to receive the first enable signal EN1 and a second enable signal EN2 from the control logic 104.

In the example considered, the connection device CONN_DEV includes a third DMOS transistor 130 and an NMOS transistor 132. The third DMOS transistor 130 has a drain connected to the drain of the second DMOS transistor 128 of the output stage of the second LDO regulator 116, and a source connected to the supply node VCC. The NMOS transistor 132 also has its drain connected to the drain of the second DMOS transistor 128 and its source connected to ground. Both transistors 130, 132 are controlled by the first enabling logic signal EN1.

The first regulator LDO1 operates in one of two operating states, as controlled by the first enable signal EN1. In the first state, the differential amplifier 122 of the first LDO regulator 114 is enabled by the first enable signal EN1 to control the gate voltage of the first DMOS transistor 126 based on a comparison of the feedback signal VFB with the first reference voltage VREF1. In the second state, operation of the first differential amplifier 122 and the first LDO regulator 114 are disabled by the first enable signal EN1 and the first DMOS transistor 126 is locked in a high impedance (non-conducting) condition.

The second regulator LDO2 operates in one of three operating states, as controlled by the combined first and second enable signals EN1 and EN2. In the first operating state, the second differential amplifier 124 of the second LDO regulator 116 is enabled to control the gate voltage of the second DMOS transistor 128 based on a comparison of the feedback signal VFB with the first reference value VREF1. In the second operating state, operation of the second differential amplifier 124 and the second LDO regulator 116 are disabled and the second DMOS transistor 128 is locked in a high impedance (non-conducting) condition. In the third operating state, the second DMOS transistor 128 is locked in a low impedance (conducting) condition.

The connecting device CONN_DEV operates in one of two operating states, as controlled by the first enabling logic signal EN1. In the first state, the third DMOS transistor 130 is controlled to be closed, i.e., to electrically couple the drain of the second DMOS transistor 128 with the supply node VCC, while the NMOS transistor 132 is concurrently controlled to be open, i.e., to electrically isolate the drain of the second DMOS transistor 128 from ground. In the second state, the conditions of the transistors 130, 132 are reversed: the third DMOS transistor 130 is controlled to be open while the NMOS transistor 132 is controlled to be closed.

The two control signals VCTRL1 and VCTRL2, combined by the control logic 104 to produce the enabling logic signals EN1 and EN2, define three distinct regions of operation of the supply circuit 106, to which correspond three different topologies of the power supply circuit of the internal control circuitry, to which, in turn, correspond different levels of power consumption, as indicated in the following table.

TABLE 1

| Region | Operating mode | Output voltage condition |
|---|---|---|
| 1 | VCC generated by LDO1 (VIN powered) | VOUT < VREF2/KDIV1 |
| 2 | VCC directly connected to VOUT via DMOS2 and DMOS3 | VREF2/KDIV1 < VOUT < VREF2/KDIV2 |
| 3 | VCC generated by LDO2 (VOUT-powered) | VREF2/KDIV2 < VOUT |

The three logical combinations of the two control signals VCTRL1 and VCTRL2 and the corresponding logical combinations of the pair of enabling signals EN1 and EN2 of the two linear voltage regulators, LDO1 and LDO2, and of the connection device CONN_DEV, and the three consequent configurations of the supply circuit 106 that they implement through the gate signals GATE1, GATE2, applied to the devices DMOS1 and DMOS2, respectively, are indicated in the following table.

TABLE 2

| Region | VCTRL1 | VCTRL2 | EN1 | EN2 | GATE1 | GATE2 |
|---|---|---|---|---|---|---|
| 1 | 0 | 0 | 1 | 0 | Controlled by LDO 114 | VOUT |

TABLE 2-continued

| Region | VCTRL1 | VCTRL2 | EN1 | EN2 | GATE1 | GATE2 |
|---|---|---|---|---|---|---|
| 2 | 1 | 0 | 0 | 0 | VIN | VOUT − $V_{GS,MAX}$ |
| 3 | 1 | 1 | 0 | 1 | VIN | Controlled by LDO 116 |

In the operating region 1, the behavior of the internal supply circuit 106 is that of the linear voltage regulator: In this region, the power consumption by the internal circuitry is the greatest. The first LDO regulator 114 is in its first operating state, the second LDO regulator 116 is in its second operating state, and the connection device CONN_DEV is in its second operation state. Accordingly, the VCC voltage is determined solely by the first LDO regulator 114, with the second LDO regulator 116 disabled and with the second DMOS transistor 128 in a high impedance, non-conducting state. The third DMOS transistor 130 of the connection device CONN_DEV, between the supply node VCC and the second LDO regulator 116, is open and non-conducting, while the NMOS transistor 132 is closed, grounding the second DMOS transistor 128.

In the operating region 3, the first LDO regulator 114 is in its second operating state, the the second LDO regulator 116 is in its first operating state, and the connection device CONN_DEV is in its first operation state. Thus, the first LDO regulator 114, powered by VIN, is switched off and the second LDO regulator 116, powered by VOUT, is switched on. In this way, the current to power the whole control circuitry, i:e, the supply circuit 106 and the controller 108, is no longer drawn from the input source (VIN), on the contrary it is drawn from the output node (at the voltage VOUT) of the switching converter (which is lower than VIN in view of the fact that the converter is of step-down type) and as a consequence, the internally consumed power decreases by a factor equal to VOUT/VIN. The voltage VCC is solely provided by the second LDO regulator 116, with the first LDO regulator 114 disabled and its output DMOS transistor 126 in a high impedance state. In this region, the connection device CONN_DEV is enabled to couple the output DMOS transistor 128 of the second LDO regulator 116 with the VCC node.

In the operating region 2, besides achieving the above described result, a further reduction of current absorption is obtained because none of the two linear regulators is active. The first LDO regulator 114 is in its second operating state, the second LDO regulator 116 is in its third operating state, and the connection device CONN_DEV is in its first operation state. Thus, VCC voltage is more or less equal to VOUT (less the voltage drop on the second and third DMOS transistors 128, 130), LDO1 is disabled, with its output DMOS transistor 126 in a high impedance state, and the second LDO regulator 116 is also disabled, with the gate of the second DMOS transistor 128 forced to VOUT-$V_{GS,max}$. The third DMOS transistor 130 of the connection device CONN_DEV is enabled in order to ensure the minimum connection resistance between VOUT and VCC.

In view of the fact that the DC-DC converter is of the step-down type, the output voltage VOUT being, by definition, lower than the input supply voltage VIN, it is evident that the power consumption in regions 2 and 3 is less than that consumed in region 1. Furthermore, because neither of the linear regulators 114, 116 is in operation while the output voltage VOUT is in the operating region 2, which corresponds to the nominal output voltage of the converter, they consume almost no power while the converter is able to maintain the output voltage VOUT near its target value.

The results in terms of reduction of the power consumption in the internal circuitry using the novel architecture of the applicant are summarized in the following table in which are also indicated the values taken by the ratio $K_P = P_{INT}/P_{OUT}$, the trend of which is a determining factor in evaluating the efficiency (in view of the fact that the efficiency $\eta = 1/(1+K_P)$).

TABLE 3

| Region | $P_{INT}$ | $K_P = P_{INT}/P_{OUT}$ |
|---|---|---|
| 1 | VIN * ($I_{CTRL} + I_{LDO}$) | VIN/VOUT * ($I_{CTRL} + I_{LDO}$)/$I_{OUT}$ |
| 2 | VOUT * $I_{CTRL}$ | $I_{CTRL}/I_{OUT}$ |
| 3 | VOUT * ($I_{CTRL} + I_{LDO}$) | ($I_{CTRL} + I_{LDO}$)/$I_{OUT}$ |

As may be deduced from Table 3, the novel DC-DC converter of the applicant achieves a reduction of power consumption that is greater or equal to the conversion ratio of operation of the converter, and such a result is obtained also in applications wherein the output voltage may undergo large variations.

Preferably, the VOUT monitoring block 102, as schematically exemplified in FIG. 4, is designed in a way to introduce an adequate hysteresis in both of the two triggering thresholds, in order to eliminate the risk of oscillation between adjacent regions of operation that could be caused by disturbances or noise.

In an application wherein the output voltage may cross or stay for long periods of time in the operation region 2 of the converter, the increment of efficiency compared to prior art converters is remarkable, because the power consumption of a linear voltage regulator that, in applications designed for extremely low power consumption, represents one of the dominant items of current absorption, may be practically eliminated.

Figure 6:
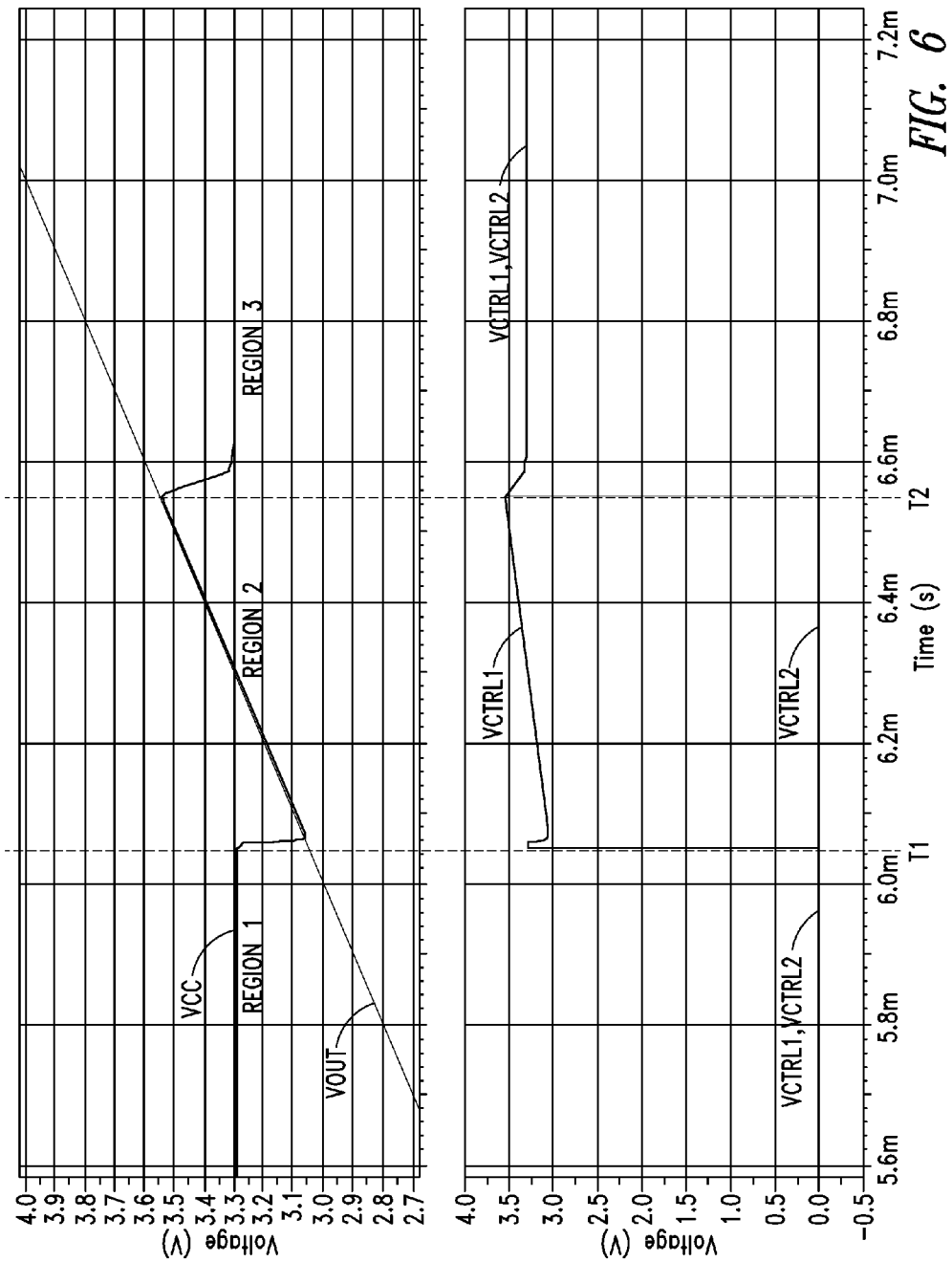
FIG. 6 shows a diagram representative of the way the novel mechanism of power supplying of the internal circuitry functions upon variations of the output voltage of the converter.

The behavior of the proposed architecture is diagrammatically illustrated in FIG. 6, wherein the states of the control signals VCTRL1 and VCTRL2, which define the functioning region corresponding to the value of VOUT may be observed. Moreover, it is possible to observe as, in region 2, the VCC is identical to VOUT because of the direct strapping obtained by switching on with fullest VGS the second DMOS transistor 128 and the connection device CONN_DEV, and how the VCC is constant in the operating regions 1 and 3 because of the switching on of the first and second LDO regulators 114, 116, respectively. The vertical dashed lines T1 and T2 in the graph of FIG. 6 correspond to the points at which the rising slope of the output voltage VOUT crosses the threshold values VREF2/KDIV1 and VREF2/KDIV2, respectively. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for supplying an internal power supply of a DC-DC switching converter, comprising:
  defining first and second thresholds of discrimination of an output voltage of the DC-DC switching converter, tied to a reference voltage;

defining three regions of operation of the converter, based on ranges of values of the output voltage of the converter relative to the first and second thresholds of discrimination;

while the output voltage of the converter is lower that the first threshold of discrimination, operating the converter in a first one of the three regions of operation, including:
enabling a first linear regulator coupled to an input voltage of the converter, and
disabling a second linear regulator coupled to the output voltage of the converter, including placing in a high impedance state an output stage of the second linear regulator;

while the output voltage is greater than the second threshold of discrimination, operating the converter in a second of the three regions of operation, including:
disabling said first linear regulator connected to the input voltage, including placing in a high impedance state an output stage of said first linear regulator, and
enabling said second linear regulator connected to the output voltage; and while the output voltage is equal or greater than said first threshold and lower than or equal to said second threshold, operating the converter in a third one of the three regions of operation, including:
disabling said first linear regulator, including placing in a high impedance state the output stage of said first linear regulator, and
disabling said second linear regulator, including placing in a low impedance state the output stage of the second linear regulator.

2. The method of claim 1, wherein each of said thresholds of discrimination has a hysteresis of magnitude sufficient to eliminate risks of oscillating between two adjacent regions of operation.

3. The method of claim 1, comprising:
comparing the output voltage of the converter to each of the thresholds of discrimination and generating first and second control signals based on the respective comparisons;
generating first and second enabling signals based on logical combinations of the first and second control signals;
supplying the first enabling signal to the first linear regulator; and
supplying the first and second enabling signals to the second linear regulator.

4. The method of claim 1 wherein:
operating the converter in the first region of operation comprises:
operating the first linear regulator to regulate the internal power supply by selectively coupling the input voltage of the converter with an internal supply voltage node of the converter, and
opening a switch connected between the output stage of the second linear regulator and the internal supply voltage node of the converter;
operating the converter in the second region of operation comprises directly coupling the output voltage of the converter with the internal supply voltage node of the converter, including closing the switch connected between the output stage of the second linear regulator and the internal supply voltage node of the converter; and
operating the converter in the third region of operation comprises:
operating the second linear regulator to regulate the internal power supply by selectively coupling the output voltage of the converter with the internal supply voltage node of the converter, and
closing the switch connected between the output stage of the second linear regulator and the internal supply voltage node of the converter.

5. A DC-DC switching converter, comprising:
an input configured to receive an input voltage;
an output configured to output an output voltage lower than said input voltage;
a power switch electrically coupled between said input and said output, and configured to supply electrical power toward an external electrical load;
a controller configured to control the power switch; and
an internal supply voltage circuit configured to provide a regulated supply voltage to the controller, the internal supply voltage circuit including:
a two-threshold and two-output comparator configured to compare an output voltage of the converter with first and second voltage thresholds, and to generate first and second control signals;
a first linear voltage regulator having an output stage configured to selectively couple the input of the converter with an internal supply voltage node;
a second linear voltage regulator having an output stage configured to selectively couple the output of the converter with the internal supply voltage node; and
a control circuit configured to receive the first and second control signals from the comparator and control operation of the first and second linear voltage regulators according to values of the first and second control signals, including:
while the output voltage of the converter is lower than the first threshold, enabling said first linear regulator, and disabling said second linear regulator, including placing in a high impedance state an output stage of said second linear regulator;
while the output voltage of the converter is greater than said second threshold, disabling said first linear regulator, including placing in a high impedance state an output stage of said first linear regulator, and enabling said second linear regulator;
while the output voltage is greater than said first threshold and lower than said second threshold, disabling said first linear regulator, including placing in a high impedance state the output stage of said first linear regulator, and disabling said second linear regulator, including placing in a low impedance state the output stage of said second linear regulator.

6. The converter of claim 5, wherein the internal supply voltage circuit includes a connection device having a transistor connected between the output stage of the second linear regulator and the internal supply voltage node, and wherein the control circuit is configured to close the transistor while the output voltage of the converter is lower than the first threshold, and to open the transistor while the output voltage of the converter is greater than the first threshold.

7. The converter of claim 6, wherein said connection device includes:
a transistor having a first type of conductivity connected between said output stage of said second linear regulator and said internal supply voltage node; and
a transistor having a second type of conductivity, opposite the first type of conductivity, connected between the output stage of said second linear regulator and ground.

8. The converter of claim 5, wherein the comparator is configured to incorporate a hysteresis with respect to the comparison of the output voltage of the converter with each one of said thresholds.

9. The converter of claim 5, further comprising a driver circuit coupled between the controller and a control terminal of the power switch and configured to drive the control terminal of the power switch based on a control signal from the controller, the controller and driver circuit having respective supply inputs configured to receive the regulated supply voltage from the internal supply voltage circuit.

10. A circuit for regulating an internal supply voltage of a voltage converter, comprising:
a first linear voltage regulator, including a first transistor configured to couple an input voltage of the converter with an internal supply voltage node of the converter;
a second linear voltage regulator, including a second transistor configured to couple an output voltage of the converter with the internal supply voltage node; and
a control circuit configured:
while the output voltage is below a first threshold, to enable operation of the first linear voltage regulator to regulate the internal supply voltage of the converter by selectively coupling the input voltage of the converter with the internal supply voltage node,
while the output voltage is above a second threshold, to enable operation of the second linear voltage regulator to regulate the internal supply voltage of the converter by selectively coupling the output voltage with the internal supply voltage node, and
while the output voltage is above the first threshold and below the second threshold, to disable operation of the first and second linear voltage regulators and to continuously couple the output voltage with the internal supply voltage node.

11. The circuit of claim 10, comprising a third transistor positioned in a current path between the output voltage and the internal supply voltage node, and wherein the control circuit is configured to close the third transistor while the output voltage is above the first threshold.

12. The circuit of claim 11, wherein the third transistor is connected between the second transistor and the internal supply voltage node, and wherein the control circuit is configured to close the second transistor while the output voltage is above the first threshold and below the second threshold.

13. The circuit of claim 10, comprising a comparison circuit configured to compare the output voltage with the first and second thresholds and to produce a first control signal corresponding to a value of the output voltage relative to the first threshold and a second control signal corresponding to a value of the output voltage relative to the second threshold, and wherein the control circuit is configured to control operation of the first and second linear voltage regulators according to values of the first and second control signals.

14. A method for regulating an internal supply voltage of a voltage converter, comprising:
while an output voltage of the converter is below a first threshold, regulating the internal supply voltage by selectively coupling an input voltage of the converter with an internal supply voltage node of the converter, according to a value of the internal supply voltage relative to a reference voltage;
while the output voltage is above a second threshold, regulating the internal supply voltage by selectively coupling the output voltage with the internal supply voltage node according to the value of the internal supply voltage relative to a reference voltage, and
while the output voltage is above the first threshold and below the second threshold, coupling the output voltage with the internal supply voltage node without direct regulation.

15. The method of claim 14, wherein:
regulating the internal supply voltage by selectively coupling an input voltage comprises enabling operation of a first linear voltage regulator configured to compare a feedback signal representative of a value of the internal supply voltage with the reference voltage and to control operation of a first transistor positioned in a current path between the input voltage and the internal supply voltage node; and
regulating the internal supply voltage by selectively coupling the output voltage comprises enabling operation of a second linear voltage regulator configured to compare the feedback signal with the reference voltage and to control operation of a second transistor positioned in a current path between the output voltage and the internal supply voltage node.

16. The method of claim 15, wherein coupling the output voltage with the internal supply voltage node without direct regulation comprises disabling the first and second linear voltage regulators, holding the first transistor in an open state, and holding the second transistor in a closed state.

17. The method of claim 15, comprising comparing the output voltage with the first and second thresholds and producing a first control signal corresponding to a value of the output voltage relative to the first threshold and a second control signal corresponding to a value of the output voltage relative to the second threshold, and controlling operation of the first and second linear voltage regulators according to values of the first and second control signals.

* * * * *